United States Patent Office.

JAMES E. MILLER, OF MONROETON, PENNSYLVANIA.

COMPOSITION FOR REMOVING VARNISH.

SPECIFICATION forming part of Letters Patent No. 725,002, dated April 7, 1903.

Application filed June 20, 1902. Serial No. 112,547. (No specimens.)

*To all whom it may concern:*

Be it known that I, JAMES E. MILLER, a citizen of the United States, residing at Monroeton, in the county of Bradford and State of Pennsylvania, have invented a certain new and useful Composition of Matter to be Used for Removing Varnish from Wood and other Surfaces; and I do hereby declare the following to be a full, clear, and exact description of the invention, such as will enable others skilled in the art to which it appertains to make and use the same.

The object of my invention is to provide a simple and thoroughly efficient varnish-removing compound which may be used without disagreeable or injurious effects.

My composition consists of the following ingredients, combined in suitable proportions, viz: alcohol, amyl acetate, acetone, and butyric ether. These are to be thoroughly mingled by agitation.

In producing the compound I use the several ingredients mentioned in substantially the following proportions: three parts, by weight, of alcohol, two of amyl acetate, one part of acetone, and one part of butyric ether. It will be understood, of course, that the ingredients may be compounded in other proportions; but those stated have been found to give the best results.

The composition described is a perfect solvent for varnish. Each ingredient possesses strong solvent properties and contributes to produce an efficient solution, the alcohol diluting the amyl acetate and other substances and strengthening the solvent action of the compound, the acetone, which is the most powerful ingredient, quickening the action of the compound and tending to produce evaporation, the butyric ether retarding evaporation of the acetone and holding it well in solution, and the amyl acetate checking evaporation of the other substances and insuring a smooth clean finish to the surfaces to which the compound is applied.

The compound is quick in action, removes old varnish readily, requires no scraping or scrubbing, does not injure the hands nor eat the brush with which it is applied, and does not discolor the wood nor injure the surface, but leaves the surface to which it is applied in perfectly smooth condition and in its natural color. It is also pleasant to use, having an agreeable odor.

In using the above-named composition it should be applied freely with a brush to the varnished surface, and as soon as the varnish is dissolved (three to five minutes) the surface should be wiped clean with a suitable cloth or pad of waste. Then with another clean cloth or pad of waste dipped into the compound the surface should be cleaned up and allowed to dry. A stiff brush may be used for cleaning carvings and other places difficult to reach with the pad of waste.

Other ingredients may be incorporated in my composition without departing from the scope of my invention. Thus I may employ any desired perfuming agent, such as oil of sassafras. Benzol may also be used as a good base or filler to cheapen the compound, since it mixes well with the other ingredients and does not alter the characteristics of the composition except by making it work more quickly on account of the property of benzol for rapid evaporation.

In some instances it is desirable to produce the compound in the form of an emulsion, and any suitable substance or substances may be added for this purpose.

Having thus fully described my invention, what I claim as new, and desire to secure by Letters Patent of the United States, is—

1. The herein-described composition of matter for removing varnish from wood and other surfaces consisting of alcohol, amyl acetate, acetone and butyric ether.

2. The herein-described composition of matter for removing varnish from wood and other surfaces consisting substantially of three parts of alcohol, two of amyl acetate, one of acetone and one of butyric ether, all by weight.

In testimony whereof I affix my signature in presence of two witnesses.

JAMES E. MILLER.

Witnesses:
C. A. CHILD,
G. H. LANDON.